United States Patent
Fließ

(10) Patent No.: US 11,178,611 B2
(45) Date of Patent: Nov. 16, 2021

(54) LOW DUTY CYCLE TRANSMISSION SCHEME FOR NB IOT DEVICES

(71) Applicant: COMMSOLID GMBH, Dresden (DE)

(72) Inventor: Thomas Fließ, Dresden (DE)

(73) Assignee: COMMSOLID GMBH, Dresden (DE)

( * ) Notice: Subject to any disclaimer, the term of this patent is extended or adjusted under 35 U.S.C. 154(b) by 144 days.

(21) Appl. No.: 16/477,297

(22) PCT Filed: Jan. 9, 2018

(86) PCT No.: PCT/EP2018/050438
§ 371 (c)(1),
(2) Date: Jul. 11, 2019

(87) PCT Pub. No.: WO2018/130514
PCT Pub. Date: Jul. 19, 2018

(65) Prior Publication Data
US 2020/0037244 A1 Jan. 30, 2020

(30) Foreign Application Priority Data
Jan. 16, 2017 (EP) .................................... 17151594

(51) Int. Cl.
*H04W 52/02* (2009.01)
*H01M 10/42* (2006.01)
(Continued)

(52) U.S. Cl.
CPC ..... *H04W 52/0216* (2013.01); *H01M 10/425* (2013.01); *H02J 7/345* (2013.01); *H04W 52/0229* (2013.01); *H02J 2007/0067* (2013.01)

(58) Field of Classification Search
CPC ............. H01M 10/425; H01M 10/4264; H02J 2007/0067; H02J 7/0063; H02J 7/345; H04W 52/0216; H04W 52/0229
See application file for complete search history.

(56) References Cited

U.S. PATENT DOCUMENTS

2005/0077880 A1 4/2005 Turner et al.
2011/0009095 A1* 1/2011 Uemura ................ H04W 48/14
455/411

(Continued)

OTHER PUBLICATIONS

International Search Report and Written Opinion issued in PCT/EP2018/050438 dated Mar. 27, 2018.
(Continued)

*Primary Examiner* — Minh Trang T Nguyen
(74) *Attorney, Agent, or Firm* — Heslin Rothenberg Farley and Mesiti PC; Nicholas Mesiti (57) ABSTRACT

The invention discloses a transmission scheme for mobile communication devices scheduled in a cell of a network by a base station, whereas a user equipment (UE) powered by a power supply transmits a block of payload information defined by a limited transmission power over a contiguous total transmission time, whereas transmissions of consecutive blocks of payload information of one UE are separated by scheduling gaps resulting from scheduling of UE transmissions by base station. The object of the invention to introduce a transmission scheme that can improve and/or extend the power supply/battery lifetime of NB-IOT devices as well as reduce the size and cost of such cheap mass-market devices without reducing the network coverage or cell capacity will be solved by a new transmission scheme with a scheduling gap which has a variable length with a defined minimum time duration which corresponds to a power supply recovery time and whereas the scheduling gap is extended in order to increase the power supply recovery time, respectively.

19 Claims, 6 Drawing Sheets a) Contiguous transmission of a single block of information
b) Transmission a single block of information with small gap for re-sync
c) Transmission of 2 blocks with a scheduling gap of variable length with a certain minimum (51) Int. Cl.
*H02J 7/34* (2006.01)
*H02J 7/00* (2006.01)

(56) References Cited

U.S. PATENT DOCUMENTS

| | | | | |
|---|---|---|---|---|
| 2012/0250612 | A1* | 10/2012 | Jalloul | H04B 7/0805 |
| | | | | 370/328 |
| 2014/0167842 | A1* | 6/2014 | Chen | H03F 3/24 |
| | | | | 330/127 |
| 2015/0057011 | A1* | 2/2015 | Di Girolamo | H04W 16/14 |
| | | | | 455/454 |

OTHER PUBLICATIONS

ZTE Corporation, "Discussion on the Tx Gaps for frequency error correction and the effective battery capacity for NB-IOT" 3GPP Draft; R4-163297, May 22, 2016, Retrieved from Internet: http://www.3gpp.org/ftp/Meetings_3GPP_SYNC/RAN4/Docs/.
Carla F. Chiasserini et al., "A Model for Battery Pulsed Discharge with Recovery Effect" Wireless Communications and Networking Conference, Sep. 21, 1999 IEEE, pp. 636-639.
Carla F. Chiasserini et al., "Pulsed Battery Discharge in Communication Devices" Proceedings of the 5th Annual ACM/IEEE International Conference on Mobile Computing and Networking, Aug. 1, 1999, pp. 88-95.
Ka. Selvaradjou et al., "A New Battery and Redundancy Aware Node Scheduling Protocol for Wireless Sensor Networks" Communication Systems Software and Middleware and Workshops, 2008, Comsware 2008, 3rd International Conference on IEEE Jan. 6, 2008, pp. 784-790.

* cited by examiner

Fig. 3 a) Contiguous transmission of a single block of information
b) Transmission a single block of information with small gap for re-sync
c) Transmission of 2 blocks with a scheduling gap of variable length with a certain minimum

Fig. 4 a) Current for transmissions with small gaps (state-of-the-art)
b) Battery voltage with bad recovery after Tx (state-of-the-art)
c) Current for transmissions with large gaps (new)
d) Battery voltage with sufficient recovery time between transmissions (new)

Fig. 5 a) Contiguous transmission of information with high power (state-of-the-art)
b) Contiguous transmission of same information with low power (state-of-the-art)
c) Transmission of same information with high power and new low duty cycle scheme (new)

Fig. 6 a) Single legacy UE with high power
b) Single legacy UE with reduced power
c) Scheduling of multiple legacy UEs with high power
d) Single UE transmitting with high power according to new scheme
e) Multiple UE scheduled according to new scheme

LOW DUTY CYCLE TRANSMISSION SCHEME FOR NB IOT DEVICES

CROSS REFERENCE TO RELATED APPLICATIONS

This application is the National Phase filing under 35 U.S.C. § 371 of International Application No.: PCT/EP2018/050438, filed on Jan. 9, 2018, which claims priority to European Application No.: 17151594.3, filed on Jan. 16, 2017. The contents of each of the prior applications are hereby incorporated by reference herein in their entirety.

The invention discloses a transmission scheme for mobile communication devices (user equipment—UE) scheduled in a cell of a network by a base station, whereas a user equipment (UE) powered by a power supply transmits a block of payload information defined by a limited transmission power over a contiguous total transmission time, whereas transmissions of consecutive blocks of payload information of one UE are separated by scheduling gaps resulting from scheduling of UE transmissions by base station (eNB).

BACKGROUND ART

Figures 1, 2:
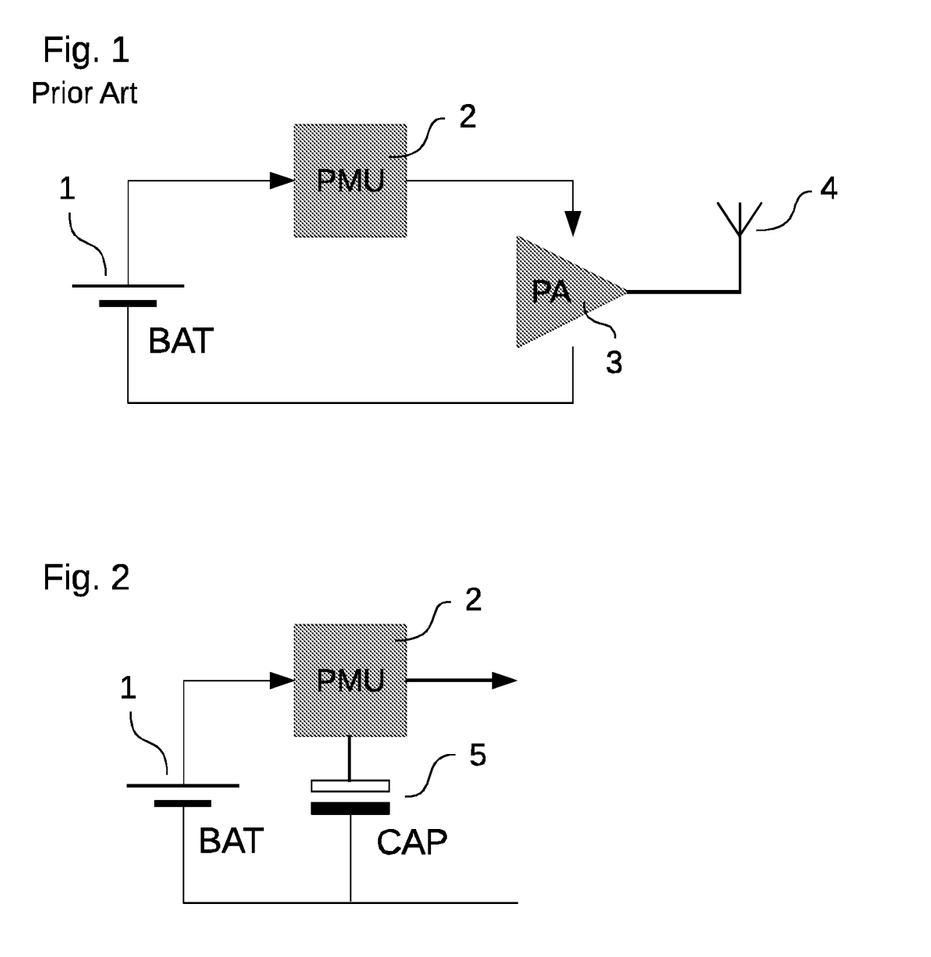
FIG. 1 A schematically view of the supplying of the power amplifier of the UE (state-of-the-art)
FIG. 2 A schematically view of the supplying of the power amplifier of the UE by using a buffering capacitor (state-of-the-art)

Mobile communication devices (user equipment—UE) are usually powered by batteries. The power amplifier (PA) as one of the main elements of the uplink (UL) transmission path of a UE is commonly supplied from battery via a so-called power management unit (PMU). This power management unit is responsible for generating the needed power amplifier supply voltage from the battery voltage which may vary over the lifetime of the battery and even active periods of the UE. FIG. 1 shows schematically the battery supplying the power amplifier of the UE managed by the power management unit.

With the introduction of devices for so-called internet-of-things (IoT) applications, battery cost and lifetime become increasingly important in system design.

On one hand, network operators, service providers and end users desire increased coverage in IoT radio networks, e.g. 3GPP narrowband NB-IoT. In many scenarios energy needed for transmissions from UE to base station (eNB) becomes already the limiting factor of battery lifetime.

On the other hand, UE manufacturers are interested in using cheap, standard batteries with small form factors in their devices. Small form factors describe an aspect of design which defines and prescribes the size, shape, and other physical specifications of hardware components, particularly in electronics and electronic packaging. Such batteries are designed for operation on circuitry requiring low, contiguous supply currents but not for high peak currents required by e.g. IEEE bluetooth or 3GPP LTE as examples for data transmission standards. The 3GPP has acknowledged this, for example in 3GPP TSG RAN WG4 Meeting #78, R4-161157 with the title "Battery Considerations on Transmit Power for IoT". The reduction in the peak current consumption can enable NB-IoT devices to be used with products, e.g. wearables, for which a coin cell, or similar, is needed. It was proposed that a maximum transmit power of 18-20 dBm should be considered for NB-IoT as an additional power class in order to take into account the peak current capability of battery types that might be used for some IoT applications (e.g. wearables).

A well-known technique to overcome peak current limitations is the introduction of a buffer capacitor (CAP) (FIG. 2). The capacitor is charged from the normal supply in order to provide a high peak current if it is desired. Supplying high peak currents for limited amount of time by buffer capacitors is a well-known technique, available for instance as separate module.

In current versions of the 3GPP NB-IoT (narrowband internet of things) standard, multiple power classes have been defined which specify the maximum transmission power a UE has to generate in uplink transmission. Release 13 of 3GPP standard just defines power classes with 20 and 23 dBm maximum transmission power whereas in release 14 and an additional class with 14 dBm maximum transmission power has been introduced. The latter was introduced to simplify design and reduce cost of cheap mass-market devices but comes at cost of reduced network coverage or cell capacity. The coverage of a network defines the geographical area where the base stations of a network can communicate with user equipment devices. The network is distributed over land areas called cells, each served by at least one fixed-location transceiver, but more normally three cell sites or base stations. These base stations provide the cell with the network coverage which can be used for transmission of voice, data and others. When one UE transmits data to a base station on a certain radio resource, this radio resource will be occupied for other UEs. A radio resource is a part of the available frequency spectrum which can be assigned/scheduled to one UE for a certain time interval. From the cell's point of view, the cell capacity would be high, if the UE would transmit its payload information with a high transmission power in a relatively short time. From the UE's point of view this has the disadvantage that the power supply of the UE has to deliver high peak power in a short time which also reduces the lifetime of the power supply of the UE, for example the lifetime of a battery. The above mentioned introduction of an additional power class with 14 dBm maximum transmission power mitigates the high peak power consumption of the UEs and hence it would be helpful and suitable to increase the lifetime of the UEs' power supply. But beside the positive effect, from the cell's point of view the transmission time for transmitting the same amount of payload information of one UE will be increased which means concurrently that during this time no other UE can use the radio resource to the cell, and hence the total cell capacity decreases.

Furthermore, the uplink gaps have been introduced into the standard for the purpose of re-synchronization, e.g. downlink (DL) measurements and adaption of local parameters like frequency correction. But the duration of these re-synchronization gaps and the resulting duty cycle reduction is rather small and not affective for significant reduction of peak power consumption.

Figure 3:
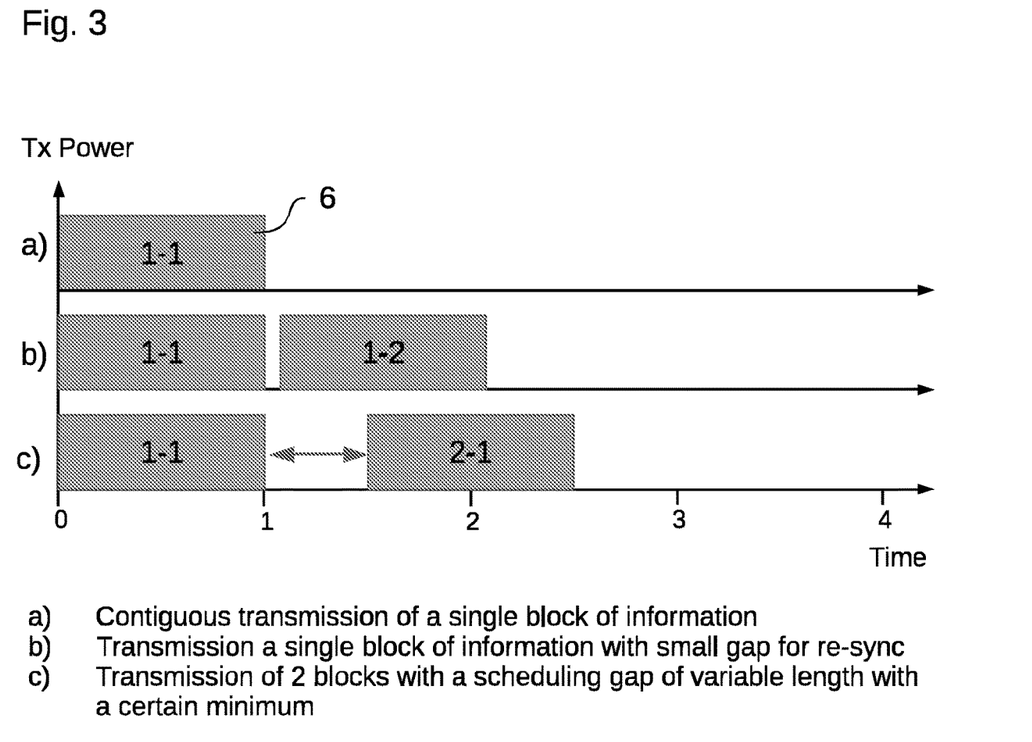
FIG. 3 a) transmission of one block of payload information; b) transmission of one block of payload information with small gap for re-sync; c) transmission of two blocks of payload information from one UE.
Figure 5:
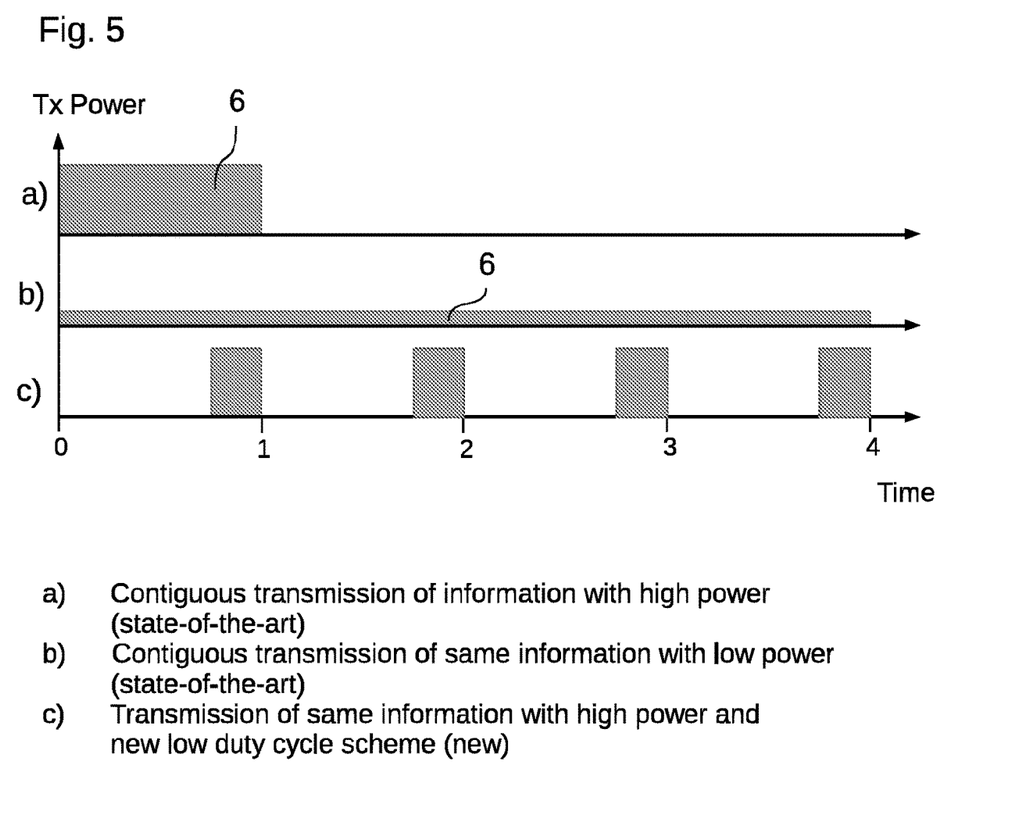
FIG. 5 Transmission schemes of state-of-the-art (a) and (b); new inventive transmission scheme (c)

Therefore, state-of-the-art UEs transmit mostly contiguously either with high power over a short period of time (FIG. 5a) or with low power over a long period of time (FIG. 5b) to convey the same amount of payload information to base station of a certain network cell. In computing and telecommunications, the payload information is the part of transmitted data that is the actual intended message. The payload information includes all headers or metadata sent solely to facilitate payload information delivery. FIG. 3a shows a contiguous transmission of a single block of payload information of one UE. For re-synchronization purposes during long transmissions it is commonly known to split the transmission of a single block of information into two or more parts with a small gap between the parts (FIG. 3b). For transmitting different blocks of payload information, the base station decides when the second block will be transmitted (FIG. 3c), hitherto this is not defined in the standard, but is at the sole discretion of the base station. All transmission scenarios are transmission power-wise limited by the UE specific or cell specific maximum transmission power.

Coin batteries are widely used to power simple mass-market mobile and even stationary devices due to their cost-effectiveness and small size. Such coin cells are designed to deliver a small continuous current over a long time.

Figure 4:
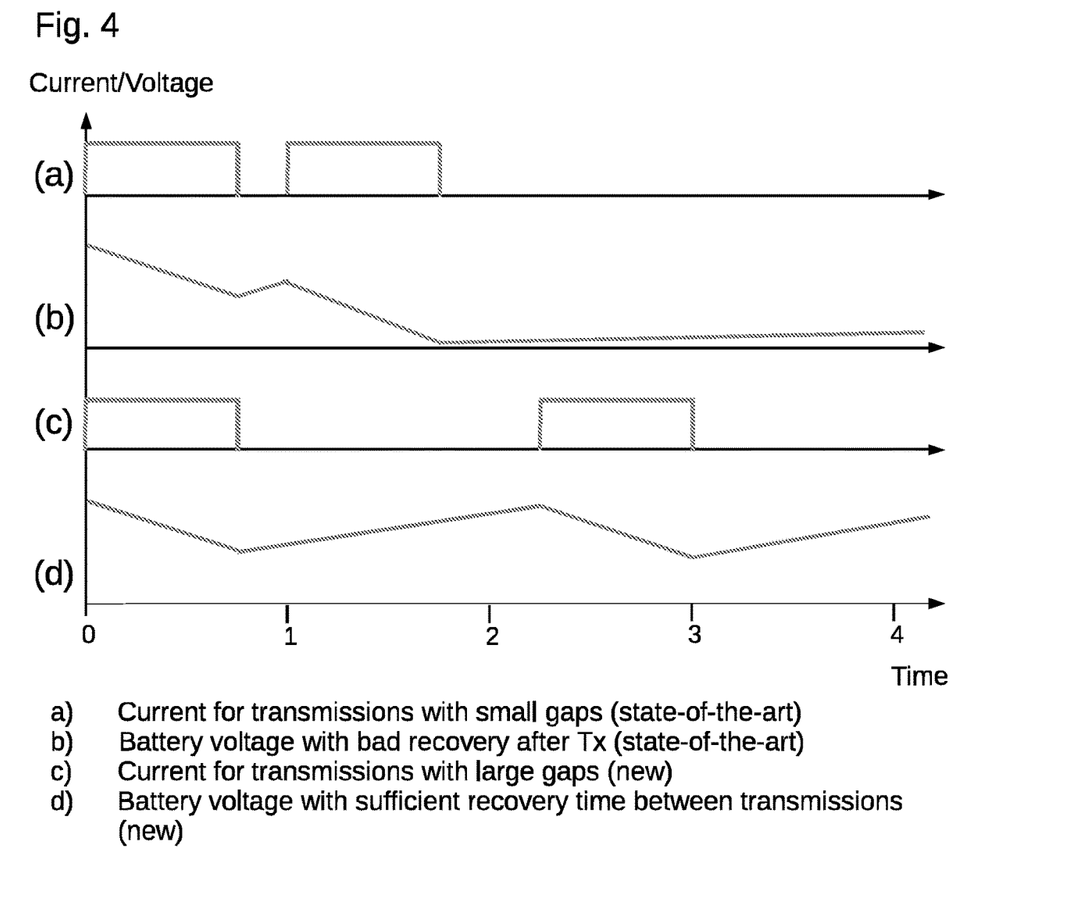
FIG. 4 Behavior of certain currents and voltages in the transmitter path over time; a) and b) are state-of-the-art; c) and d) according to the new transmission scheme.

In contrast to that, modern wireless communication techniques like bluetooth or NB-IoT use fairly short transmissions with in comparison high power in uplink transmission, e.g. from UE to the base station. When exposing coin cells as power source/supply to such a use case scenario, the available capacity of coin cells gets reduced dramatically. Thus, power supply/battery lifetime may be reduced to unacceptable levels. FIG. 4a shows the current for transmissions with small gaps between the blocks of payload information as it is performed in the state of the art. According to this performance FIG. 4b shows the battery voltage with a bad recovery after the transmission. The lifetime of the battery will be decreased.

Buffering techniques like the one described in state-of-the-art (FIG. 2) may be deployed to work around the high peaks in current drained from a battery of a UE. However, in NB-IoT the maximum duration of a single transmission may extend to some seconds. Assuming a peak current of 100 mA, a duration of 1 sec and an allowable voltage drop of 0.5V, buffer capacity must already be C=0.2 F. This becomes easily unacceptable from cost and size point of view for low-cost mass-market devices.

It is therefore the object of the invention to introduce a transmission scheme that can improve and/or extend the power supply/battery lifetime of NB-IOT devices as well as reduce the size and cost of such cheap mass-market devices without reducing the network coverage or cell capacity.

It is also an object of the invention that it is possible to use cheaper battery technology for NB-IoT devices for a given lifetime of such devices.

SUMMARY OF THE INVENTION

The object of the invention will be solved therein that a scheduling gap has a variable length with a defined minimum time duration which corresponds to a power supply recovery time and whereas the scheduling gap is extended in order to increase the power supply recovery time, respectively. One can also say that the scheduling gap has an increased minimum length which corresponds to a certain power supply recovery time compared to the previous defined gap which minimum duration results from the physical layer procedure definitions in 3GPP TS 36.211. According to the invention the scheduling gap is a gap between transmissions of two consecutive blocks of payload information of one UE. Until now, there are also gaps between two transmission blocks of payload information, but the base station deciding independently when another block of payload information is transmitted by one UE. The hitherto existing transmission gaps may be far too narrow for the above mentioned purpose, namely for increasing the power supply recovery time. In order to use the full capacity of the inventive idea it is necessary that the scheduling gap has a defined minimum time duration, since the power supply, i.e. a battery needs some time to recover. Therefore, the existing scheduling gaps are not suitable as their minimum time duration is too small. The minimum length of those existing scheduling gaps is defined in 3GPP TS 36.213 Release 13. Maximum transmission power is defined by UE specific power class or cell specific maximum power.

Another advantage of the present invention is that the thermal stress of the UE can be reduced due to the reduced transmission duty cycle and the extended scheduling gaps which can be used for cooling down. The transmission duty cycle will be understood as the fraction of one period from the start of one transmission to the start of the next transmission in which the UE actively transmits payload information.

In another very preferred embodiment of the inventive transmission scheme the transmission of the block of payload information of the one UE is split into multiple transmission active period parts which are separated by a transmission gap to each other, whereas each transmission active period part is transmitted with the same limited transmission power over a duty-cycle length, whereas the transmission is performed until the block of payload information is fully transmitted. According to the invention the transmission gap is a gap between two transmission active period parts of the same block of payload information of one UE.

A duty-cycle length is the length in which one transmission active period part is performed. It is the central idea of solving the object of the invention to introduce new uplink transmission schemes to 3GPP where UEs transmit signals in bursts with low duty-cycle and reasonably short active periods. Meaning that the entire transmission is split into multiple parts separated by transmission gaps such that the entire transmission of one block of information gets spread over a long period of time. This enables the usage of cheap coin cells in conjunction with buffer solutions of acceptable capacity in terms of cost and size.

A transmission active period part is a part of the transmission of a block of payload information that the UE communicates actively in uplink direction e.g. with a base station with a transmission power limited by UE specific or cell specific maximum power but only for a short period of time, meaning for a low duty-cycle length. The UE repeats or performs the transmission of the transmission active period parts until the whole block of payload information is fully transmitted.

Compared with contiguous or high duty cycle transmissions with high power, the inventive transmission scheme enables a peak current reduction on battery supply in the UE devices by deploying small, cost-effective energy buffers.

In a preferred embodiment of the invention the transmission gap has a configurable length with a defined minimum time duration that corresponds to a power supply recovery time, whereas it is used to increase the power supply recovery time after a transmission.

The new transmission scheme with splitting the entire transmission into multiple parts that get spread over a longer period of time yields a low duty-cycle length on the transmit path of the UE, allowing the deployment of buffer circuitry with reasonable buffer capacity.

During the transmission gap the power supply, i.e a battery of a UE can recover. This recovery time is needed to prolong the life time of the power supply, especially the life time of a battery.

Figure 7:
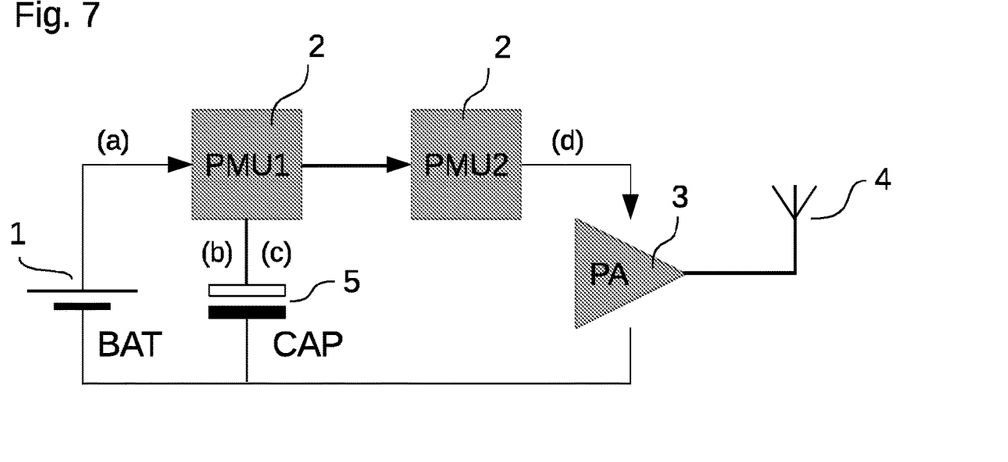
FIG. 7 A schematically view of the combination of supplying the power amplifier of the UE by using a buffering capacitor.

In a preferred embodiment of the invention the block of payload information is transmitted over an uplink transmission path of the UE comprising a power amplifier, an energy buffer circuitry, a power management unit and the power supply configured to supply the uplink transmission path of the UE with power. The buffer circuitry reduces the peak current on power supply/battery and hence increase power supply/battery lifetime. Therefore, the invention enables a better exploitation of nominal battery capacity and thus a higher battery lifetime in the same usage scenario. FIG. 7 shows a UE which can use and implement the inventive transmission scheme. While being charged from the normal supply during idle periods, the capacitor delivers the desired high peak current during active periods. FIG. 7 shows schematically the power supply for the power amplifier of a UE with a buffer capacitor and a first and a second power management unit (PMU1 and PMU2). The first power management unit (PMU1) enables charging of the buffer capacitor (CAP) some time before transmission and limits the current that drawn from the battery during a transmission. The second power management unit (PMU2) provides instantaneous power during active transmissions to the power amplifier (PA) using the power supplied by PMU1 and energy stored in the CAP.

In a further preferred embodiment of the invention the power management unit generates a needed power amplifier supply voltage from the power supply and compensates fluctuations of the power supply or in transmission active period parts of the UE. This has the advantageous effect that the transmission power will be constant over time.

In another preferred embodiment the energy buffer circuitry comprises a storage mean which is loaded by the power supply and controlled by a first power management unit. A storage mean is a mean for storing energy.

In a further preferred embodiment the power amplifier of the UE is powered by a current of the buffer circuitry and controlled by a second power management unit. The power management units of a UE manage the power consumption and control the energy buffer circuitry and power amplifier of the UEs. It is also advantageous that the temperature regime of the UE can be regulated, because a lower duty-cycle length and longer transmission gaps reduce the thermal stress of the UEs.

In a preferred embodiment of the invention the power supply is a battery, especially a coin cell battery. Coin batteries are widely used to power simple mass-market mobile and even stationary devices due to their cost-effectiveness and small size. Such coin cells are designed to deliver a small continuous current over a long time. Therefore, UE and mass-market devices can be powered by cheap and small power sources. This is only possible if the inventive transmission scheme is used. If the hitherto existing transmission schemes are used, such cheap and small batteries will be empty in a very short time.

In an embodiment of the invention the limited transmission power and the duty-cycle length of the transmission active period part of the UE is adaptable such that occupation of radio resources and battery life time are jointly optimized for the UE. This means that the radio resource occupation and battery lifetime of a UE are balanced.

In general, successful transmissions from various UEs require similar amount of energy per payload information bit to be received at base station side. That means that the same amount of information can be transferred with reduced transmit power if the duration of the transmission is extended accordingly. However, if the received power of a certain UE gets too small, the base station may not be able anymore to detect the presence of this UE, preventing it from attaching to this cell. Received power is determined by transmitted power and loss on the propagation path. The latter increases with the distance from UE to the base station, limiting the coverage of the cell. If maximum transmit power of a UE decreases as it is done for the 14 dBm power class, the coverage range gets reduced as well. With the adaption of the size of the transmission active period part, the duty-cycle length of the transmission active period part of the UE allowing for battery recovery and hence the new transmission scheme the reduction of cell coverage will be avoided by maintaining the same high maximum transmit power as with the high power state-of-the-art scheme without sacrificing battery lifetime.

In a further embodiment of the inventive transmission scheme the cell of a network serves several UEs in a time-multiplexed fashion, whereas individual UEs transmit with transmission powers up to the individual limited transmission power with different duty-cycle lengths so that individual battery lifetime and utilization of cell capacity are jointly optimized. So, with other words each UE possesses an individual power class and hence an individual maximum transmission power. In general, successful transmissions from various UEs require a similar amount of energy per payload information bit to be received at base station side. If transmit power is decreased by a certain factor, the time for transmission of the same amount of information has to be increased by the same factor. Hence, a UE with lower transmit power will occupy the available cell capacity for a longer time than a UE with higher transmit power, assuming similar channel conditions for both. Thus, total cell capacity gets decreased if UEs with reduced transmit power are active. With the new transmission scheme the base station can schedule multiple UEs by time multiplexing such that the full cell capacity is utilized without reducing battery lifetime of individual UEs.

In another preferred embodiment of the invention the transmission scheme is dynamically configurable for each UE in the cell.

Therefore, it is necessary to extent the existing standard by extension of scheduling information in the narrowband physical downlink control channel (NPDCCH) to have information about enabling/disabling the new transmission scheme as well as extending the UE with the extended uplink transmission path.

Summarizing, to enable the proposed scheme in a 3GPP compliant NB IoT network, the following extensions to the standard are therefore required: In the radio resource control (RRC) protocol the addition of the UE capability is necessary for indicating the support of low duty-cycle transmissions. Furthermore, a configuration of low duty-cycle transmission specific parameters is necessary, e.g. indicating active period and cycle lengths. Optionally, it would be beneficial if the new feature can be enabled/disabled for backward compatibility.

In the narrowband physical downlink control channel (NPDCCH) information enabling/disabling of the new transmission scheme need to be added. Furthermore, an extension of scheduling information is required if the transmission scheme is to be configured dynamically.

And for the overall procedures the new transmission scheme has to be incorporated into the physical (PHY) procedures.

The invention may be applied to other wireless standards where uplink transmissions happen for a limited duration, are controlled by a central scheduler and can be split into subsections which can be meaningful combined at receiver side. It should be mentioned that for buffering of energy, technology other than capacitors may be deployed as well.

BRIEF DESCRIPTION OF THE DRAWING FIGURES

The invention will be explained in more detail using exemplary embodiments.

The appended drawings show

DETAILED DESCRIPTION

FIG. 4 shows the behavior of certain currents and voltages when a UE transmits some blocks of information. FIG. 4*a* shows the current/voltage of a UE according to the transmission scheme defined by the LTE standard according to the state-of-the art. According to this transmission FIG. 4*b* shows the battery voltage of a UE. As one can see, the gaps between two transmission events are too short for the battery of the UE to recover. Since the battery has no time to recover the battery life time is limited and will be drastically decreased over time. FIG. 4*c* shows the extended scheduling gaps between two transmission blocks according to the invention. The standard has to be modified in that a minimum duration between the transmission of one UE has to be defined ensuring that the battery of a UE has enough time to recover. It is also possible to use more expensive battery technologies to ensure a specified battery life-time by using the existing transmission scheme, but with the new transmission scheme it is possible to use cheaper and smaller batteries to realize the same specified battery life-time as it is shown in FIG. 4*d*.

FIG. 5*a* and FIG. 5*b* show the transmission schemes used according to the state-of-the-art. In current versions of the 3GPP standard multiple power classes have been defined which specify the maximum transmission power a UE has to generate in uplink transmission. Release 13 of 3GPP standard just defines power classes with 20 and 23 dBm maximum transmission power (FIG. 5*a*) whereas in release 14 and an additional class with 14 dBm maximum transmission power has been introduced. The latter was introduced to simplify design and reduce cost of cheap mass-market devices but comes at cost of reduced network coverage or cell capacity because the same block of information will be transmitted over a longer time in which no other UE can be served by this cell on a particular radio resource.

FIG. 5*c* shows the transmission of the same information as in FIG. 5*a* with high power but with the new transmission scheme with low duty cycle, whereas the block of payload information is split into multiple transmission active period parts which are separated by a transmission gap to each other.

Figure 6:
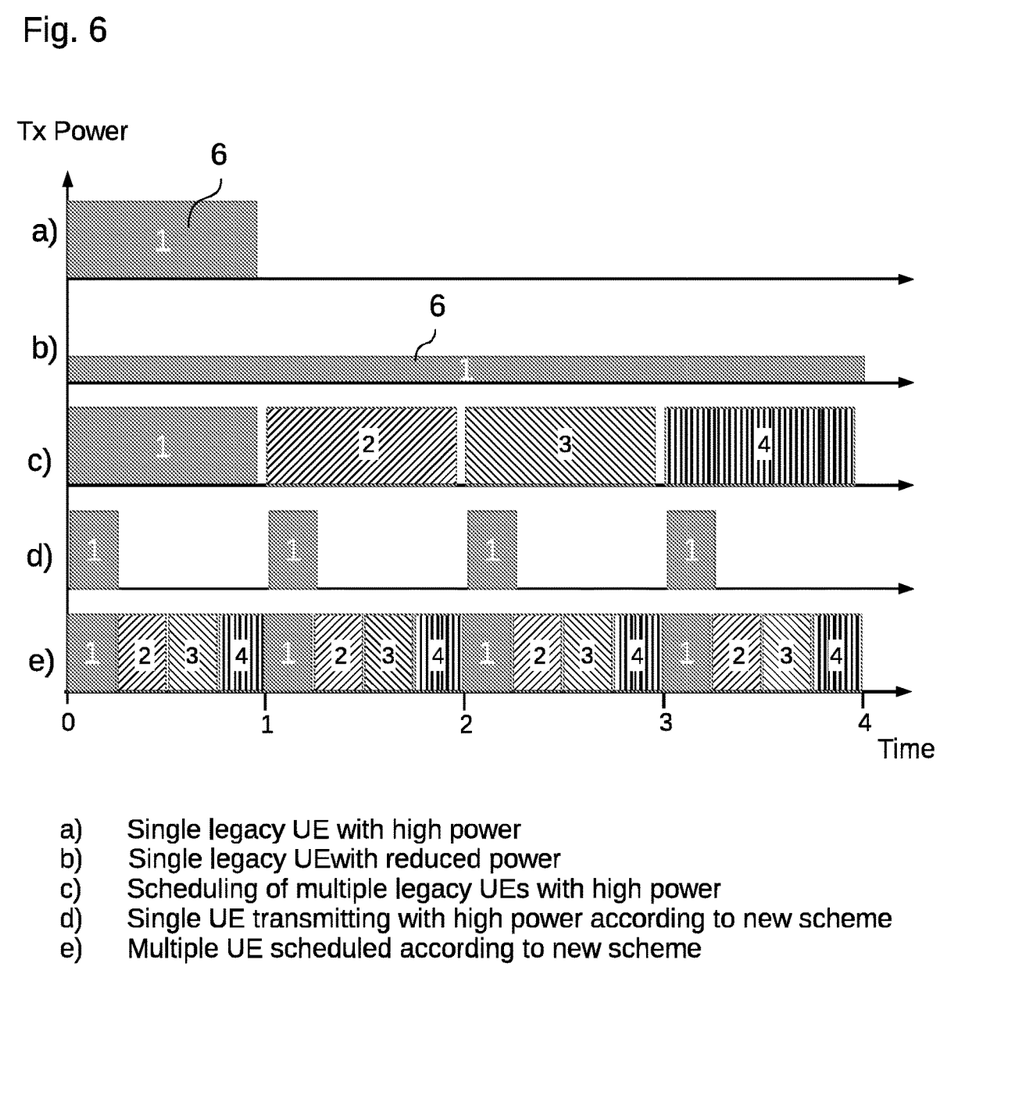
FIG. 6 Transmission schemes: a) 1 UE transmitting a block of payload information scheduled with high power; b) 1 UE transmitting a block of payload information with low power over a longer duty-cycle length; c) 4 UEs, each transmitting a block of payload information scheduled all with high power and high duty-cycle length; d) 1 UE scheduled with high power/low duty-cycle length according to the scheme proposed in this invention; e) 4 UEs scheduled with high power/low duty-cycle length according to the scheme proposed in this invention.

FIG. 6*a* illustrates one UE transmitting a block of payload information scheduled with high power continuously. FIG. 6*b* illustrates one UE with continuously low power transmission over a longer duty cycle length. FIG. 6*c* illustrates the scheduling of multiple, i.e. four legacy UEs with high power each transmitting a block of information in a continuous manner. FIG. 6*d* illustrates the transmission according to the new transmission scheme, whereas a single UE transmits multiple transmission active parts with high power which are separated by a transmission gap to each other. If the cell has to serve multiple UE FIG. 6*d* illustrates the multiple UE scheduled with high power/low duty cycle according to the new scheme. From the cell's point of view, the cell capacity is high, because the cell serves several UE in a short time. The UE has to provide high peak power consumption only for a short period, whereas in the meantime the battery can recover before the next transmission active part has to be transmitted. This will extend the lifetime of the UE's battery.

Furthermore, the new transmission scheme proposed in this invention avoids the reduction of cell coverage by maintaining the same high maximum transmit power as with the high power state-of-the-art scheme.

Figure 8:
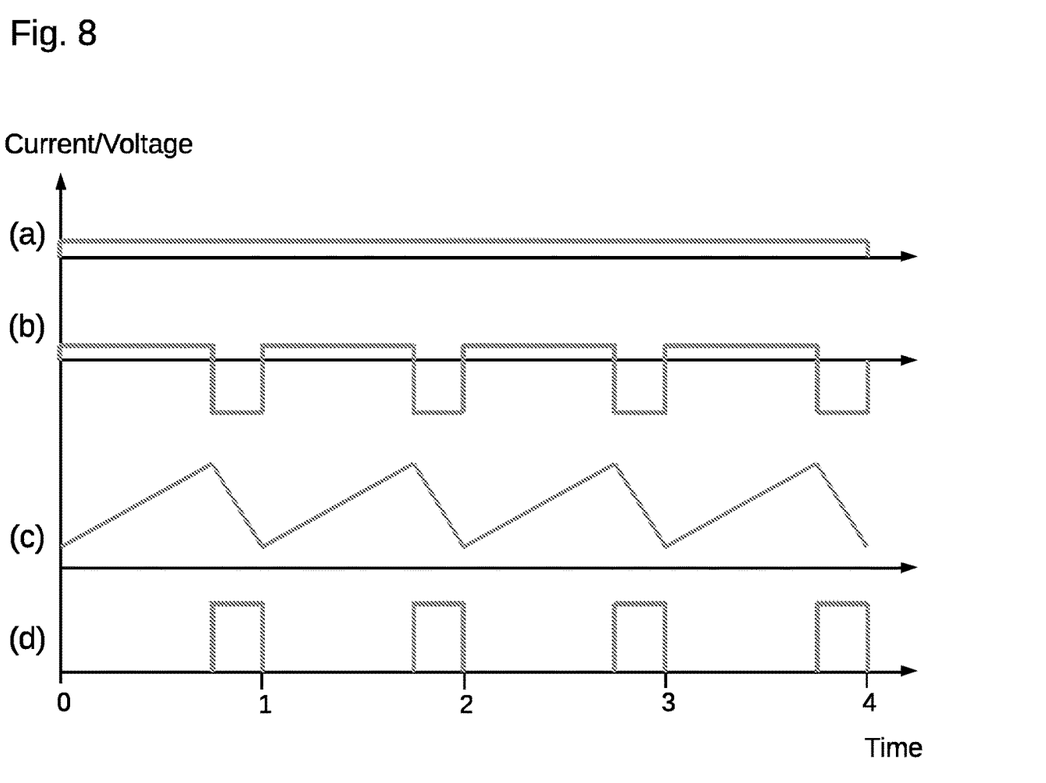
FIG. 8 Behavior of certain currents and voltages in the transmitter path over time according to the powering of a UE in FIG. 7.

FIG. 7 shows a UE which can use and implement the inventive transmission scheme. While being charged from the normal supply during idle periods, the capacitor delivers the desired high peak current during active periods. FIG. 7 shows schematically the power supply for the power amplifier of a UE with a buffer capacitor and a first and a second power management unit (PMU1 and PMU2). The first power management unit (PMU1) enables charging of the buffer capacitor (CAP) some time before transmission and limits the current that drawn from the battery during a transmission. The second power management unit (PMU2) provides instantaneous power during active transmissions to the power amplifier (PA) using the power supplied by PMU1 and energy stored in the CAP. The buffer circuitry reduces the peak current on battery supply and hence increase battery lifetime. For the circuitry in FIG. 7, FIG. 8 illustrates the behavior of certain currents and voltages in the transmitter path over time: a) the battery current, b) the current to buffer the capacitor (negative sign for discharge), c) voltage at the buffer capacitor and d) current to the power amplifier. The high current to the power amplifier is only necessary in the duty-cycle transmission active period part.

Usually, a cell of a network serves multiple UEs in parallel. In NB IoT, the UEs can be scheduled in frequency- and time-multiplexed fashion (FIG. 6*c*).

In general, successful transmissions from various UEs require a similar amount of energy per payload information bit to be received at base station side. If transmit power is decreased by a certain factor, the time for transmission of the same amount of information has to be increased by the same factor. Hence, a UE with lower transmit power will occupy the available cell capacity for a longer time than a UE with higher transmit power, assuming similar channel conditions for both. Thus, total cell capacity gets decreased if UEs with reduced transmit power are active.

With the new transmission scheme proposed in this invention, base station can schedule multiple UEs by time multiplexing such that the utilization of cell capacity is optimized.

If the received power of a certain UE gets too small, the base station may not be able anymore to detect the presence of this UE, preventing it from attaching to this cell. The received power is determined by transmitted power and loss on the propagation path. The latter increases with the distance from UE to base station, limiting the coverage of a cell. If maximum transmit power of a UE decreases, the coverage range gets reduced as well. The new transmission scheme proposed in this invention avoids the reduction of cell coverage by maintaining the same high maximum transmit power as with the high power state-of-the-art scheme.

The invention may be applied to other wireless standards where uplink transmissions happen for a limited duration, are controlled by a central scheduler and can be split into subsections which can be meaningful combined at receiver side. It should be mentioned that for buffering of energy, technology other than capacitors may be deployed as well.

LIST OF REFERENCE SIGNS 1 power supply; e.g. battery
2 power management unit
3 power amplifier
4 antenna
5 buffer capacitor
6 block of payload information

The invention claimed is:

1. A transmission scheme for extending a power supply recovery time of mobile communication devices (user equipment—UE) scheduled in a cell of a network by a base station, whereas a user equipment (UE) powered by a power supply transmits a block of payload information defined by a limited transmission power over a contiguous total transmission time, whereas transmissions of consecutive blocks of payload information of one UE are separated by scheduling gaps resulting from scheduling of UE transmissions by a base station (eNB), wherein a scheduling gap has a variable length with a defined minimum time duration which corresponds to a power supply recovery time and whereas the scheduling gap is extended in order to increase the power supply recovery time, respectively.

2. A transmission scheme according to claim 1, wherein the transmission of the block of payload information of the one UE is split into multiple transmission active period parts which are separated by a transmission gap to each other, whereas each transmission active period part is transmitted with the same limited transmission power over a duty cycle length, whereas the transmission is performed until the block of payload information is fully transmitted.

3. A transmission scheme according to claim 2, wherein the transmission gap has a configurable length with a defined minimum time duration and corresponds to a power supply recovery time, whereas it is used to increase the power supply recovery time.

4. A transmission scheme according to claim 1, wherein the block of payload information is transmitted over an uplink transmission path of the UE comprising a power amplifier, an energy buffer circuitry, a power management unit and the power supply configured to supply the uplink transmission path of the UE with power.

5. A transmission scheme according to claim 4, wherein the power management unit generates a needed power amplifier supply voltage from the power supply and compensates fluctuations of the power supply or in transmission active period parts of the UE.

6. A transmission scheme according to claim 4, wherein the energy buffer circuitry comprises a storage device which is loaded by the power supply and controlled by a first power management unit.

7. A transmission scheme according to claim 4, wherein the power amplifier of the UE is powered by a current of the buffer circuitry and controlled by a second power management unit.

8. A transmission scheme according to claim 1, wherein the power supply is a battery, especially a coin cell battery.

9. A transmission scheme according to claim 2, wherein the limited transmission power and the duty cycle length of the transmission active period part of the UE is adaptable such that occupation of radio resources and battery life time are jointly optimized for the UE.

10. A transmission scheme according to claim 1, wherein the cell of the network serves several UEs in a time-multiplexed fashion, whereas individual UEs transmit with transmission powers up to the individual limited transmission power with different duty cycle lengths so that individual battery lifetime and utilization of cell capacity are jointly optimized.

11. A transmission scheme according to claim 1, wherein the transmission scheme is dynamically configurable for each UE in the cell.

12. A transmission scheme according to claim 5, wherein the energy buffer circuitry comprises a storage device which is loaded by the power supply and controlled by a first power management unit.

13. A transmission scheme according to claim 12, wherein the power amplifier of the UE is powered by a current of the buffer circuitry and controlled by a second power management unit.

14. A transmission scheme according to claim 13, wherein the power supply is a battery, especially a coin cell battery.

15. A transmission scheme according to claim 14, wherein the limited transmission power and the duty cycle length of the transmission active period part of the UE is adaptable such that occupation of radio resources and battery life time are jointly optimized for the UE.

16. A transmission scheme according to claim 15, wherein the cell of the network serves several UEs in a time-multiplexed fashion, whereas individual UEs transmit with transmission powers up to the individual limited transmission power with different duty cycle lengths so that individual battery lifetime and utilization of cell capacity are jointly optimized.

17. A transmission scheme according to claim 16, wherein the transmission scheme is dynamically configurable for each UE in the cell.

18. A transmission scheme according to claim 16, wherein the cell of the network serves several UEs in the time-multiplexed fashion, whereas individual UEs transmit multiple split transmission active period parts with transmission powers up to the individual limited transmission power with different duty cycle lengths so that individual battery lifetime and utilization of cell capacity are jointly optimized.

19. A transmission scheme for extending a power supply recovery time of mobile communication devices (user equipment—UE) scheduled in a cell of the network by a base station, whereas a user equipment (UE) powered by a power supply transmits a block of payload information defined by a limited transmission power over a contiguous total transmission time, whereas transmissions of consecutive blocks of payload information of one UE are separated by scheduling gaps resulting from scheduling of UE transmissions by a base station (eNB), wherein a scheduling gap has a variable length with a defined minimum time duration which corresponds to a power supply recovery time and whereas the scheduling gap is extended in order to increase the power supply recovery time, respectively;

wherein the transmission of the block of payload information of the one UE is split into multiple transmission active period parts which are separated by a transmission gap to each other, whereas each transmission active period part is transmitted with the same limited transmission power over a duty cycle length, whereas the transmission is performed until the block of payload information is fully transmitted; and     wherein the cell of the network serves several UEs in a time-multiplexed fashion, whereas individual UEs transmit multiple split transmission active period parts with transmission powers up to the individual limited transmission power with different duty cycle lengths so that individual battery lifetime and utilization of cell capacity are jointly optimized.

\* \* \* \* \*